United States Patent [19]

Dujardin et al.

[11] Patent Number: 5,043,403
[45] Date of Patent: Aug. 27, 1991

[54] POLYCARBONATES CONTAINING MESOGENIC COMPOUNDS AS END GROUPS, THEIR PREPARATION AND THEIR USE

[75] Inventors: Ralf Dujardin; Harald Pielartzik; Rolf Dhein, all of Krefeld, Fed. Rep. of Germany

[73] Assignee: Bayer Aktiengesellschaft, Bayerwerk, Fed. Rep. of Germany

[21] Appl. No.: 366,897

[22] Filed: Jun. 15, 1989

[30] Foreign Application Priority Data

Jun. 24, 1988 [DE] Fed. Rep. of Germany ....... 3821340

[51] Int. Cl.5 .................. C08F 283/02; G03C 1/76; C08G 63/68; C08G 65/38
[52] U.S. Cl. .................. 525/462; 528/199; 528/202; 528/204; 528/214; 528/308.7; 525/469; 430/271
[58] Field of Search ........... 528/199, 202, 204, 308.7, 528/214; 525/462, 469; 430/271

[56] References Cited

U.S. PATENT DOCUMENTS

| | | | |
|---|---|---|---|
| 3,028,365 | 4/1962 | Schnell et al. | 528/196 |
| 3,085,992 | 4/1963 | Lee et al. | 528/196 |
| 3,399,172 | 8/1968 | Jaquiss et al. | 528/196 |
| 4,111,910 | 9/1978 | Baggett | 528/196 |
| 4,153,780 | 5/1979 | Narita et al. | 528/198 |
| 4,153,780 | 5/1979 | Narita et al. | 528/198 |
| 4,230,548 | 10/1980 | Adelmann et al. | 204/159.14 |
| 4,269,964 | 5/1981 | Freitag et al. | 528/126 |
| 4,448,953 | 5/1984 | Rosequist et al. | 528/198 |
| 4,631,334 | 12/1986 | Matsumoto et al. | 528/202 |
| 4,677,184 | 6/1987 | Mark, deceased et al. | 528/198 |
| 4,760,118 | 7/1988 | White et al. | 528/214 |
| 4,873,178 | 10/1989 | Haruta et al. | 430/271 |

FOREIGN PATENT DOCUMENTS 305214 3/1989 European Pat. Off. .
5134992 3/1976 Japan .

OTHER PUBLICATIONS

JP 61 78864 abstract.
S. A. Haut, D. C. Schroeder et al., vol. 37, pp. 1925, 1972, Journal of Organic Chem., "Liquid Crystals, II."
JP 57 133149 abstract.

Primary Examiner—John Kight, III
Assistant Examiner—Kathryne E. Shelborne
Attorney, Agent, or Firm—Joseph C. Gil; Aron Preis

[57] ABSTRACT

This invention relates to thermoplastic, aromatic polycarbonates in which mesogenic compounds corresponding to the following formula

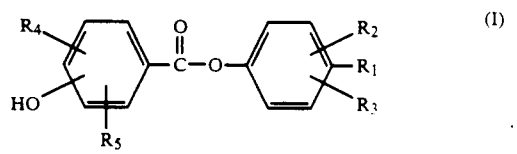

are incorporated as chain terminating agents, to their preparation by the known processes for the preparation of polycarbonates, and to their use for the production of moulded articles for optical purposes.

7 Claims, No Drawings

POLYCARBONATES CONTAINING MESOGENIC COMPOUNDS AS END GROUPS, THEIR PREPARATION AND THEIR USE

This invention relates to thermoplastic, aromatic polycarbonates having average molecular weights Mn (number average determined by gel chromatography after calibration) of at least 500 g/mol, preferably from 7500 to 100,000 g/mol and especially from 9000 to 25,000 g/mol, based on diphenols, chain terminating agents and optionally branching agents, characterized in that the chain terminating agents incorporated in them are mesogenic compounds corresponding to formula (I)

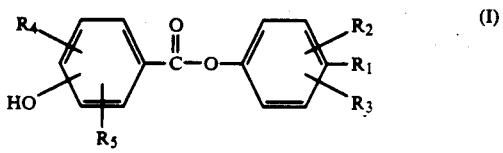

wherein $R_1$, $R_2$, $R_3$, $R_4$ and $R_5$ may be identical or different and denote hydrogen, $C_1$ to $C_{12}$ alkyl, $C_1$ to $C_{12}$ alkyloxy, $C_3$ to $C_{10}$ cycloalkyl, $C_3$ to $C_{10}$ cycloalkyloxy, $C_6$ to $C_{20}$ aryl, $C_6$ to $C_{20}$ aryloxy, $C_7$ to $C_{20}$ aralkyl, $C_7$ to $C_{20}$ aralkyloxy, trifluoromethyl, trifluoromethoxy, chlorine, bromine, iodine or nitro, $R_2$, $R_3$, $R_4$ and $R_5$ being preferably hydrogen.

The mesogenic compounds of formula (I) to be used as chain terminating agents according to the invention are either known in the literature or obtainable by the esterification of phenols with hydroxy benzoic acids by processes known from the literature (see, for example, H. Pielartzik in Houben-Weyl, "Methoden der org. Chemie", Supplementary Volume E 5, pages 656 et seq., published by Thieme Verlag 1984, or S. A. Haut, D. C. Schroeder and J. P. Schroeder in Journal of Organic Chemistry, Volume 37, page 1925, 1972).

The present invention further relates to the use of the mesogenic compounds of formula (I) as chain terminating agents for the preparation of thermoplastic, aromatic polycarbonates.

The invention also relates to the preparation of thermoplastic, aromatic polycarbonates having molecular weights Mn (number average determined as indicated above) of at least 5000 g/mol, preferably from 7500 to 100,000 g/mol, especially from 9000 to 25,000 g/mol, by the known two phase interface process, the known process in homogeneous solution (the so called pyridine process) or the known solvent free transesterification process by the reaction of carbonic acid derivatives which are reactive under the conditions of these polycarbonate syntheses with diphenols, chain terminating agents and optionally branching agents, characterized in that the chain terminating agents used are mesogenic compounds corresponding to formula (I).

The invention further relates to the thermoplastic aromatic polycarbonates obtainable by the process according to the invention.

By virtue of their advantageous properties, in particular their good flow properties, the polycarbonates according to the invention are suitable for the production of moulded parts of high dimensional accuracy such as are required in particular for optical equipment such as data stores or audio compact discs.

The present invention thus also relates to the use of the aromatic thermoplastic polycarbonates according to the invention for the production of moulded articles for optical purposes such as data stores or audio compact discs.

A wide variety of chain terminating agents have already been used for the preparation of polycarbonates (see, for example, U.S. Pat. Nos. 3,085,992, 3,399,172, 3,028,365, 4,111,910, EP-OS 0,001,579, EP-OS 0,886,579, U.S. Pat. No. 4,677,184, JP-OS 3,499,2/76 and DE-OS 2,842,005). Phenols and alkyl phenols are the most commonly used.

One important object in the choice of chain terminating agents for polycarbonates is the relationship of molecular weight and mechanical properties on the one hand to the flow properties and processibility on the other hand. If the molecular weight is low, the flow properties and processibility are satisfactory but the mechanical properties of the polycarbonate are in many cases no longer optimal. If, on the other hand, the molecular weight is high, then the mechanical properties are suitable but processing is more difficult.

The use of the mesogenic compounds corresponding to formula (I) as chain terminating agent has the surprising effect of providing an advantageous combination of mechanical properties and flow properties for a given molecular weight.

Examples of compounds of the general formula (I) suitable for the purpose of this invention include esters of p-hydroxy benzoic acid or of m-hydroxy benzoic acid and phenol, p-cresol, 3,5-dimethyl phenol, p-ethyl phenol, p-propyl phenol, p-n-butyl phenol, p-nonyl phenol, p-cyclohexyl phenol, p-phenyl phenol, p-trifluoromethyl phenol, 3,5-bis-trifluoromethyl phenol, p-methoxy phenol, p-(4-methoxyphenyl)-phenol, p-chlorophenol, p-fluorophenol and p-nitrophenol.

The products are characterized by the usual methods (GC, $^1$H-NMR, IR).

The liquid crystalline state of melts may be investigated by means of a polarization microscope (Reichert, Thermovar). For the investigations carried out, the eye piece was equipped with an attachment containing a photoelectric diode at the focus of the lens. A measuring amplifier with adjustment device was attached to adjust the measured value obtained when the microscope was switched on in the absence of a sample of material, with Nicol's prisms arranged in parallel, to 100 scale divisions. A value of 0.01 scale divisions was then obtained with crossed Nicol's prisms.

The products were investigated after the samples had been melted at temperatures from 280° to 400° C. If brightening of the melt was observed between the crossed Nicol's prisms over all or part of this whole range, the product was graded as thermotropic liquid crystalline.

Liquid crystalline products give values above 1 scale division in the measuring arrangement, either in the sheared or in the unsheared state, in most cases values from 3 to 90 scale divisions, while amorphous melts give values of less than 0.1 scale divisions.

The method described above is particularly suitable for a rapid laboratory determination and gives unequivocal results in almost all cases. In cases of doubt it may be advisable to confirm the presence of liquid crystalline components in the melt by means of x-ray wide angle scattering as described, for example, by G. W. Gray and P. A. Windsor in "Plastic Crystals, Physico-Chemical Properties and Methods of Investigation", in particular chapter 3, John Wiley & Sons, New York, Sydney, Toronto, 1974.

The quantity of mesogenic or thermotropic liquid crystalline compound of formula (I) used as chain terminating agent for adjusting molecular weight Mn to within the range of from 5000 g/mol to 100,000 g/mol is from 0.5 mol % to 10 mol %, preferably from 2 mol % to 7 mol %, based on the number of mols of diphenols put into the process.

When branching agents are used in addition, in other words when trifunctional or higher than trifunctional compounds are used in the usual quantities of from 0.05 mol % to 2 mol %, based on the number of mols of diphenols, then the quantity of chain terminating agent of formula (I) is from 0.5 mol % to 10 mol %, preferably from 3 mol % to 6 mol %.

The diphenols suitable for the purpose of this invention may be either mononuclear or higher nuclear and may in addition contain heteroatoms and/or substituents, halogen and alkyl being the preferred substituents, especially chlorine, bromine, methyl and ethyl.

Diphenols used according to the invention preferably correspond to formula (II):

HO—Z—OH wherein Z denotes a divalent aromatic group containing 6 to 30 carbon atoms which may be unsubstituted or substituted by halogen, for example by chlorine or bromine, or by alkyl, for example by methyl or ethyl.

The following examples are examples of suitable diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, α,α'-bis-(hydroxyphenyl)diisopropyl benzenes and α,ω-bis-(hydroxyphenyl)-polysiloxanes and corresponding compounds which are alkylated or halogenated in the nucleus. These and other suitable diphenols are described e.g. in U.S. Pat. Nos. 3,028,365, 2,999,835, 3,148,172, 2,991,273, 3,271,367, and 2,999,846, German Offenlegungsschriften 1,570,703, 2,063,050, 2,036,052 and 2,211,956, French Patent Specification 1,561,518 and European Specification EP-0-122,535 and in the monograph by H. Schnell, "Chemistry and Physics of Polycarbonates", Interscience Publishers, New York, 1964.

The following are examples of preferred diphenols: 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, α,α'-bis-(4-hydroxyphenyl)-p-diisopropyl benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5- dimethyl-4-hydroxyphenyl) -2-methyl butane, 1,α,α'-bis-(phenyl)-p-diisopropyl benzene, 2,2-bis-(3,5-dichloro-4-hydroxy-phenyl)-propane, 2,2-bis-(3,5-dibromo-4-hydroxphenyl)-propane and diphenols corresponding to the following formula IIa:

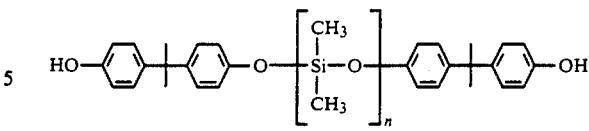

wherein n is about 40 to 100.

The following are examples of particularly preferred diphenols: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl) -propane, 2,2-bis-(3,5-dibromo-4-hydroxyphenyl)propane and 1,1-bis-(4-hydroxyphenyl)-cyclohexane.

Any mixtures of the above mentioned diphenols may also be used.

Both for the phase interface process and for the process in homogeneous solution, the carbonic acid derivatives, must be reactive under the conditions of polycarbonate preparation. These may include carbonyl halides or bishalogen formates of the diphenols put into the process. Phosgene and bis-chloroformates are preferred, phosgene being particularly preferred.

Carbonic acid derivatives which are reactive for the solvent free transesterification process include diaryl carbonates, especially diphenyl carbonate or the bisaryl carbonates of the diphenols put into the process. Diphenyl carbonate is the preferred carbonate for the solvent free transesterification process.

The quantity of carbonic acid derivatives used is from 1 mol to 2 mol per mol of diphenol in the case of the phase interface process and the process in homogeneous solution, and bis-halogen formates are used in quantities of from 0.5 to 1 mol of diphenol.

For the solvent free transesterification process, the quantity of carbonic acid derivative used is from 1.0 mol to 2.5 mol per mol of diphenol. When bis-aryl carbonates are used, these are required in a quantity of from 1.0 mol to 1.5 mol per mol of diphenol.

Branching agents suitable for the purpose of this invention, i.e. compounds which are trifunctional or higher than trifunctional (the term "functional" referring to the reactivity under the conditions of the process for the preparation of the polycarbonates) are in particular those containing 3 or more than 3 phenolic OH groups.

The following are examples of some of the compounds used which have 3 or more than 3 phenolic hydroxy groups: phloroglucinol; 4,6-dimethyl-2,4,6-tri-(4-hydroxphenyl)-heptene-2; 4,6-dimethyl-2,4,6-tri-(4-hydroxyphenyl)-heptane; 1,3,5-tri-(4-hydroxyphenyl)-benzene; 1,1-tri-(4-hydroxyphenyl)ethane; tri-(4-hydroxyphenyl)-phenyl methane; 2,2-bis-[4,4-bis-(4-hydroxyphenyl)-cyclohexyl]-propane; 2,4-bis-(4-hydroxyphenyl)-isopropyl)-phenol; 2,6-bis-(2-hydroxy-5'-methylbenzyl)-4-methylphenyl; 2-(4-hydroxyphenyl)-2-(2,4-dihydroxyphenyl)propane; hexa-[4-hydroxyphenylisopropyl)-phenyl]-orthoterephthalic acid ester; tetra-(4-hydroxyphenyl)-methane; tetra-[4-(4-hydroxyphenyl-isopropyl)-phenoxy]-methane and 1,4-bis-[(4',4''-dihydroxytriphenyl)-methyl]-benzene.

Further examples of trifunctional compounds include 2,4-dihydroxy benzoic acid, trimesic acid, cyanuric chloride and 3,3-bis-(3-methyl-4-hydroxyphenyl)-2-oxo-2,3-dihydroindole.

The reaction conditions for the various methods of polycarbonate preparation suitable for the purpose of this invention, such as the reaction temperatures, reaction pressures, solvents if used, catalysts, reaction times, concentrations of the reactants in any solvents used, quantities of catalysts and nature and quantity of basic compounds, etc. are known and may be applied to the known conditions.

The apparatus, reaction vessels, stirrer mechanisms, etc. are also well known.

The preparation of the polycarbonates according to the invention is preferably carried out by the phase interface process (see H. Schnell, "Chemistry and Physics of Polycarbonates", Polymer Reviews, Volume IX, pages 33 et seq., Interscience Publishers, (1964)).

This process is generally carried out as follows: the diphenols, preferably corresponding to formula (II), are dissolved in the aqueous alkaline phase and the chain terminating agents corresponding to formula (I) required for the preparation of the polycarbonates according to the invention are added in quantities of from 0.5 to 10 mol %, preferably from 2 to 7 mol %, based on the mols of diphenols.

After the addition of an inert organic phase which is preferably a solvent for the polycarbonate, the reaction mixture is reacted with phosgene by the method of phase interface condensation at reaction temperatures of from 0° to 40° C.

For this process, the mesogenic or thermotropically liquid crystalline compounds corresponding to formula (I) must be thoroughly dissolved in the aqueous alkaline medium. The compounds of formula (I) are surprisingly found to have a solubility and reactivity comparable to the phenols conventionally used as end groups, e.g. phenol, p-tert.- butyl phenol and p-isooctyl phenol. This is all the more surprising since phenols corresponding to formula (III)

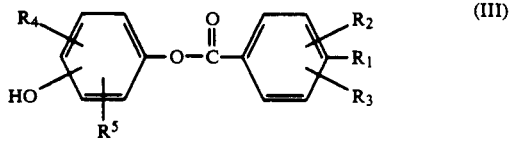

which differ from the mesogenic phenols of formula (I) used according to the invention only by the inversion of the ester groups between the aromatic ring do not act as end masking agent leading to terminated polycarbonates. Compounds corresponding to formula (III) are therefore also unsuitable for use as molecular weight regulators.

The suitability of the compounds corresponding to formula (I) as chain terminating agents for the synthesis of polycarbonates by the phase interface process was therefore not foreseeable.

The branching agents optionally used in quantities of from 0.05 to 2 mol %, based on the quantity of diphenols used, may either be introduced into the aqueous alkaline phase together with the diphenols and the chain terminating agents of formula (I) or added as solutions in an organic solvent before the phosgenation is carried out.

Instead of the diphenols, their mono- and/or bis-chlorocarbonic acid esters may be used as solutions in organic solvents. The quantity of chain terminating agent corresponding to formula (1) and of branching agent depends on the number of mols of diphenolate structural units and thus on the —O—Z—O— structural units when diphenols of formula (II) are used.

Furthermore, when chlorocarbonic acid esters are used, the quantity of phosgene may be correspondingly reduced in known manner.

The chain terminating agents of formula (I) to be used according to the invention may also be added as solutions during the stage of phosgenation. Examples of suitable organic solvents for dissolving the chain terminating agents of formula (I) include tetrahydrofuran, dioxane, pyridine, N,N-dimethyl formamide, methylglycol acetate, chloro carbonic acid esters, methylene chloride, chlorobenzene, acetonitrile and mixtures of these solvents. Especially prepared are mixtures of methylene chloride and chlorobenzene.

The organic phase used for the phase interface polycondensation may consist, for example, of methylene chloride, chlorobenzene or mixtures of methylene chloride and chlorobenzene.

The preparation of the polycarbonates according to the invention by the phase interface process may be catalyzed in the usual manner by means of catalysts such as tertiary amines, in particular tertiary aliphatic amines such as tributylamine or triethylene amine. The catalysts may be added in quantities of from 0.05 to 10 mol %, based on the mols of diphenols put into the process or on the mols of diphenolate structural units. The catalysts may be added before the onset of phosgenation or during or after phosgenation.

Isolation of the polycarbonates according to the invention is carried out in known manner, for example by evaporating the separated and washed solution of the polycarbonate in an organic solvent in an evaporation extruder followed by extrusion and granulation of the polycarbonate in known manner.

Compared, for example, with corresponding polycarbonates which have been terminated with phenol, p-tert.-butylphenol or 4-isooctyl phenol, the polycarbonates according to the invention are found to have a markedly improved fluidity at comparable average molecular weights.

The polycarbonates according to the invention can be thermoplastically processed in the usual manner at temperatures from 220° C. to 320° C. Any moulded articles and sheet products may be produced in known manner by injection moulding or extrusion.

The polycarbonates according to the invention are readily soluble in solvents such as chlorinated hydrocarbons, e.g. methylene chloride, and may therefore be worked up, for example, into cast foils in known manner.

The usual additives such as age resistors against the action of UV light, $O_2$ or moisture, flame protective agents, processing auxiliaries such as slip agents, mould release agents and plasticizers and fillers may be added to the polycarbonates according to the invention in known manner.

Specific examples of additives which may be used for the polycarbonates according to the invention include carbon black, kieselguhr, kaolin, clay, $CaF_2$, $CaCO_3$, aluminum oxides, glass fibers and inorganic pigments both as fillers and as nucleating agents.

Examples of suitable mould release agents include glycerol tristearate, trimethylol propane tristearate, pentaerythritol tetrastearate and the corresponding palmitic acid esters and myristic acid esters.

In the following examples, $\eta rel$ is determined in $CH_2Cl_2$ at 25° C. at a concentration of 0.5% by weight.

EXAMPLE 1

4.56 kg of 2,2-bis-(4-hydroxyphenyl)-propane (bisphenol A) dissolved in 8 kg of 45% sodium hydroxide solutions and 40 kg of water are introduced into a reaction vessel at 20° C. together with 20 kg of methylene chloride and 20 kg of chlorobenzene. 166 g (=3.4 mol %, based on bisphenol A) (p-methoxyphenyl-4-hydroxybenzoate) dissolved in 600 ml of tetrahydrofuran are introduced into the stirred mixture and 2.7 kg of phosgene are then introduced in 1 hour at pH 13 to 14 and 21° to 25° C. 28 ml of N-ethyl-piperidine are subsequently added and stirring is continued for 1 hour.

The aqueous phase free from bisphenolate is separated and the organic phase is washed neutral with water after acidification with phosphoric acid and extruded at 280° C. after removal of the methylene chloride by distillation. 3.9 g of product having a relative solution viscosity of $\eta_{rel} = 1.287$ are obtained.

EXAMPLE 2

15 g (0.15 mol) of phosgene are introduced within half an hour at 20° to 25° C. with stirring into a mixture of 22.8 g (0.1 mol) of bisphenol A, 20 g (0.5 mol) of sodium hydroxide, 400 ml of distilled water, 400 ml of methylene chloride and 871 mg (=3 mol %, based on bisphenyl A) of biphenyl-4-hydroxybenzoate. The reaction mixture is then stirred for half an hour after the addition of 0.14 ml of N-ethyl piperidine. The organic phase is acidified with phosphoric acid, washed free from electrolytes with water, dried and concentrated by evaporation. 25.3 g of product having a solution viscosity of $\eta_{rel} = 1.290$ are obtained.

EXAMPLES 3 to 9

A polycarbonate is prepared as described in Example 2, in each case with 3 mol % of one of the following chain terminating agents:

| Example | Chain Terminating Agent | mg | $\eta_{rel}$ |
| --- | --- | --- | --- |
| 3 | phenyl-4-hydroxybenzoate | 643 | 1.332 |
| 4 | (4-methylphenyl)-4-hydroxybenzoate | 685 | 1.335 |
| 5 | (4-cyclohexylphenyl)-4-hydroxybenzoate | 889 | 1.329 |
| 6 | (4-nitrophenyl)-4-hydroxybenzoate | 777 | 1.311 |
| 7 | (4-acetylphenyl)-4-hydroxybenzoate | 997 | 1.321 |

COMPARISON EXPERIMENTS A-D

Polycarbonates were prepared with 3 mol % of the following chain terminating agents as described in Example 2:

| Comparison Example | Chain Terminating Agent | $\eta_{rel}$ |
| --- | --- | --- |
| A | p-tert.-butyl phenol | 1.280 |
| B | phenol | 1.292 |
| C | p-iso-octyl phenol | 1.285 |
| D | (4-hydroxyphenyl)-4-methoxybenzoate | 1.827 |

The average molecular weight (Mn) determined by gel permeation chromatography after calibration and the melt viscosities ($\eta_{melt}$) determined with a Contraves-Rheomat 30 at 320° C. and a shear stress $\tau = 10^3$ Pa are shown in Table 1 for Examples 1 to 7 and comparison experiments A-D.

| Example | Mn (kg/mol) | $\eta_{melt}$ (Pa.s) | $\eta_{rel}$ |
| --- | --- | --- | --- |
| 1 | 13.2 | 199 | 1.304 |
| 2 | 14.6 | 414 | 1.290 |
| 3 | 16.0 | 8.4 | 1.332 |
| 4 | 13.8 | 74.0 | 1.335 |
| 5 | 13.5 | 86.0 | 1.329 |
| 6 | 14.5 | 35.0 | 1.311 |
| 7 | 14.2 | 122.0 | 1.321 |
| A | 13.7 | 343.0 | 1.280 |
| B | 14.0 | 357.0 | 1.292 |
| C | 14.2 | 321.0 | 1.285 |
| D | 43.0 | 623.5 | 1.827 |

What is claimed is:

1. A thermoplastic aromatic polycarbonate resin having a number average molecular weight of at least 5000 gm/mol comprising at least one chain terminating structural unit derived from a mesogenic compound corresponding to

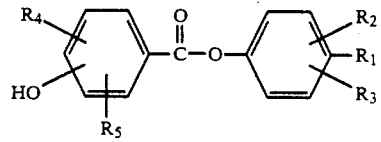

wherein $R_1$, $R_2$, $R_3$, $R_4$ and $R_5$ independently denote a hydrogen atom, $C_1$-$C_{12}$-alkyl, $C_1$-$C_{12}$-alkyloxy, $C_3$-$C_{10}$-cycloalkyl, $C_3$-$C_{10}$-cycloalkyloxy, $C_6$-$C_{20}$-aryl, $C_6$-$C_{20}$-aryloxy, $C_7$-$C_{20}$-aralkyl, $C_7$-$C_{20}$-aralkyloxy, trifluoromethyl, trifluoromethoxy, chlorine, bromine, iodine or a nitrogen atom.

2. The polycarbonate resin of claim 1 wherein number average molecular weight is about 7500 to about 100,000 gm/mol.

3. In the process for the preparation of thermoplastic aromatic polycarbonate resins the improvement comprising using as a chain terminating agent a compound conforming to

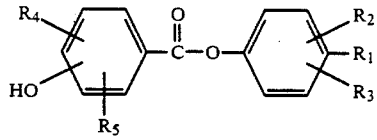

wherein $R_1$, $R_2$, $R_3$, $R_4$ and $R_5$ independently denote a hydrogen atom, $C_1$-$C_{12}$-alkyl, $C_1$-$C_{12}$-alkyloxy, $C_3$-$C_{10}$-cycloalkyl, $C_3$-$C_{10}$cycloalkyloxy, $C_6$-$C_{20}$-aryl, $C_6$-$C_{20}$-aryloxy, $C_7$-$C_{20}$-aralkyl, $C_7$-$C_{20}$-aralkyloxy, trifluoromethyl, trifluoromethoxy, chlorine, bromine, iodine or a nitrogen atom.

4. The thermoplastic aromatic polycarbonate obtained by the process of claim 3.

5. A molded article for optical applications comprising the polycarbonate resin of claim 1.

6. An audio compact disc comprising the polycarbonate resin of claim 1.

7. A data storage disc comprising the polycarbonate resin of claim 1.

* * * * *